May 3, 1927.
A. J. HARTLEY
1,626,608
GRAIN FEEDING DEVICE
Filed Oct. 3, 1925
3 Sheets-Sheet 1
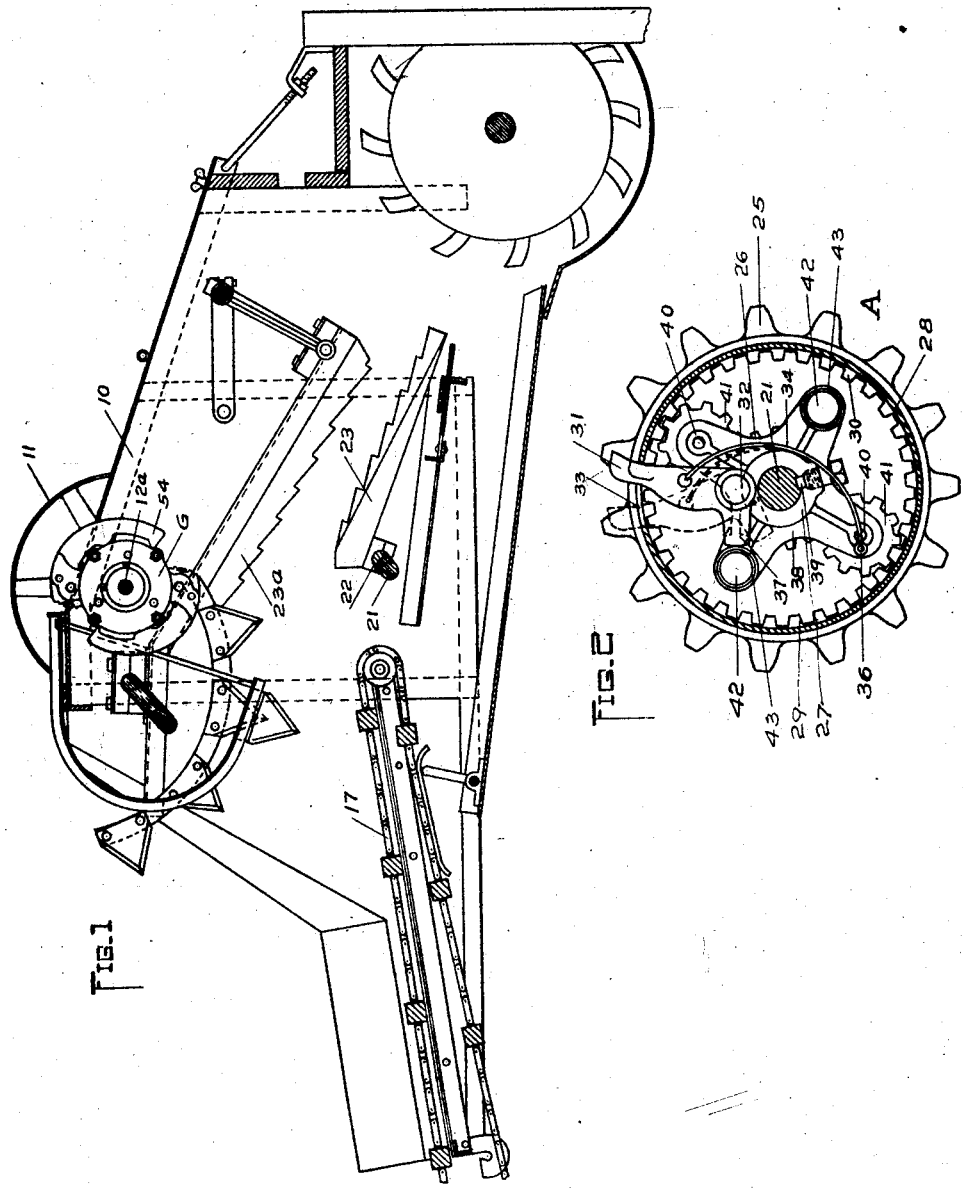
INVENTOR
Arthur J. Hartley
BY
ATTORNEYS May 3, 1927.　　　　　　　　　1,626,608
A. J. HARTLEY
GRAIN FEEDING DEVICE
Filed Oct. 3, 1925　　　3 Sheets-Sheet 2
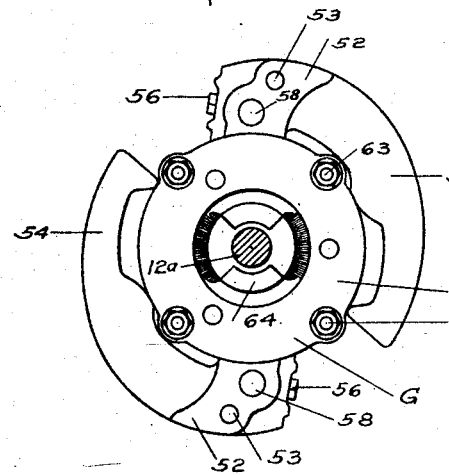
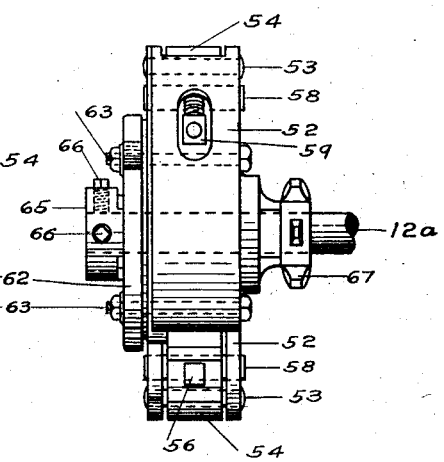
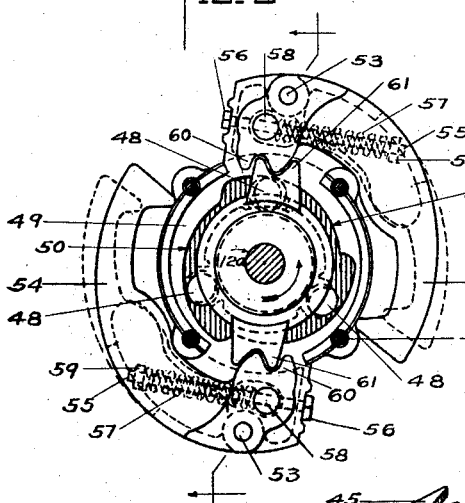
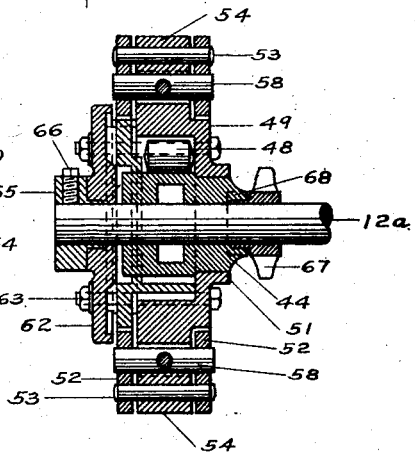
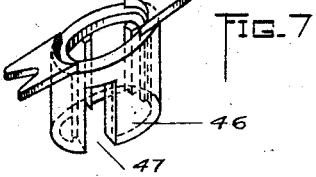
INVENTOR
Arthur J. Hartley
BY
ATTORNEYS May 3, 1927.

A. J. HARTLEY 1,626,608

GRAIN FEEDING DEVICE

Filed Oct. 3, 1925

INVENTOR
Arthur J. Hartley
BY
ATTORNEYS

Patented May 3, 1927.

1,626,608

UNITED STATES PATENT OFFICE.

ARTHUR J. HARTLEY, OF PEORIA, ILLINOIS.

GRAIN-FEEDING DEVICE.

Application filed October 3, 1925. Serial No. 60,146.

My invention relates to feeders, and more particularly to the combination including a feeder and a governor member controlling the operation of the feeding portion thereof.

The object of my invention is in the provision of a grain feeding device having in combination therewith a governor member, said governor operating in a manner to control the movement of the feeding portions, and to increase the clutching action in direct proportion to the increased load upon said feeder portions.

Another object of the invention is in the provision of a feeding device having in combination therewith a governor member controlling the operation of the feeding portions, said governor operating in a manner to increase the clutching action directly in proportion to the increased speed as well as increasing the clutching action directly in proportion to the increased load upon the feeder members.

Still other objects of my invention will appear in the following specification, taken in connection with the annexed drawings, in which—

Fig. 1 is a longitudinal sectional view, showing the operating portions of the feeding device and the location of the governor member thereon;

Fig. 2 is an enlarged detail view, partially in cross section, showing the control mechanism for the various conveyor and feeding members;

Fig. 3 is a front elevation of the governor member;

Fig. 4 is an end elevation thereof;

Fig. 5 is a longitudinal sectional view of the governor;

Fig. 6 is a cross sectional view of the governor;

Fig. 7 is an enlarged detail of a portion of the clutching mechanism, and

Figure 8:
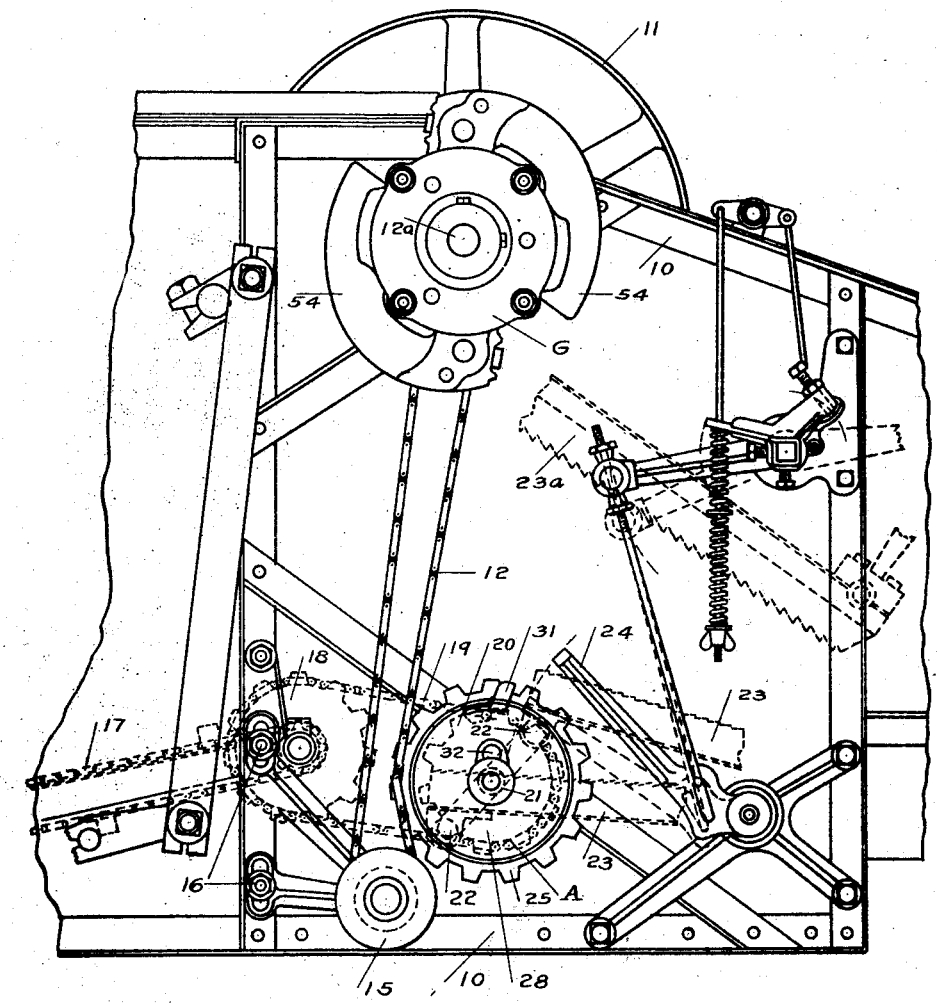
Fig. 8 is a detail showing of the gear reduction mechanism controlling the lower feed pans and main conveyor.

Referring to the drawings, I have shown the combination including my feeding device and governor member. One sheet of the drawings has been directed to the details of the governor member which in the present instance has a function that is different from the ordinary governor used on the well known feeding device.

Prior to the development of applicant's particular feeding device, means for feeding grain to a thresher cylinder have been provided in various manners, and with governors attached thereto in a manner to control the operation of said feeding member.

Governor members heretofore used were formal, insomuch as they operated, when a certain speed had been attained, to control the operation of the feeding members, due to the clutching action. In such prior feeding devices, there was an increased clutching action of the governor in direct proportion to the speed thereof. However, an increased load on the feeding members, due to wet condition of the grain or an accumulation thereof on said feeder members, with a resultant strain on the governor, would act in a manner to cause the governor member, or rather the clutching operation thereof, to slip; in other words, an increased load on the feeding members did not result in an increased clutching action of the governor, as occurs in applicant's structure.

Referring to the drawings, 10 refers generally to the frame portion of the feeder. The power wheel 11 has connection with any suitable power means. The power wheel is mounted on a shaft 12$^a$ which has a governor G attached to its opposite end. This governor will be described in detail later. A chain 12 passes over a sprocket on the shaft 12$^a$ and also around an idler 15, suitably and adjustably attached to the frame portion, as shown at 16. The conventional draper is shown at 17, and having power transmitted thereto through a sprocket 18, and chain 19, which has connection with a second sprocket 20 mounted on one end of a shaft 21. Shaft 21 has a special gearing mechanism designated generally as A, mounted upon its opposite end, this gearing mechanism to be described in detail later. The gearing mechanism A has a sprocket wheel thereon, engaging the chain 12, which has connection with the power shaft of the feeder. Shaft 21, which has mounted at one end the sprocket 20 for transmitting power to the draper, and at its other end gear mechanism, has crank arms 22 thereon, which give a corresponding movement to the lower feed pans 23. It is apparent from the gearing shown in Fig. 8 that in the normal operation, the lower feed pans are operating at a somewhat lower speed than the upper pans, in fact, at a ratio of about three to two.

A trip mechanism is provided to effect an operable connection between the upper feed pans and the gear mechanism. This trip mechanism has operable connection with the upper feed pans 23ª in the feeder. The raising and lowering of these conventional upper feed pans throw the trip lever 24 into or out of engagement with the special gear mechanism to be described.

As has been said before, the gear mechanism is provided for controlling the operation of the lower feed pans and draper member, with the result that an even supply is carried to the thresher cylinder. The above mechanism includes the following elements:

A sprocket wheel 25 is loosely mounted on the shaft 21, and has connection at all times with the constantly moving power chain 12. The sprocket wheel 25 has a small gear 26 cast integrally with the hub 27. A housing member 28 is also loosely mounted on the shaft 21 and has its open end portion 29 projecting within the sprocket 25. On the inner side of the periphery of the housing 28 are cast teeth 30 which form an internal gear. A dog 31 is pivotally mounted as at 32 on the housing 28, the outer end of said dog projecting through a slot 33 therein. The movement of the upper feed pans 23ª transmits movement through various mechanism to the before mentioned trip lever 24, which is adapted to engage the above mentioned dog 31 when moved to its lowermost position, which position will be assumed only when the upper feed pans have been raised considerably, due to the pressure of grain passing therethrough. Dog 31 is held in outwardly tensioned position by means of a spring 34 attached as at 36 to the housing plate. The dog 31 has an engagement lug 37 projecting at right angles therefrom and capable of engagement with friction rollers to be later described. A spider 38 is keyed as at 39 to the shaft 21, and pivotally mounted as at 40 on two of the projecting ends of said spider are gear wheels 41 engaging the internal gear 30 and the small gear 26 on the housing portion of the sprocket 25. Projecting in the opposite direction from the former projecting ends of the spider are the hubs 42, which have friction rollers 43 thereon.

In Figure 8 of the drawings, the position of the friction rollers with relation to the engagement lug 37 on the dog 31 is clearly shown, and it may be said that movement of the said dog permits engagement or nonengagement therebetween.

The operation of the feeding device, per se, is as follows:

The bundles of grain are carried by the draper to the operating portions of the feeder, and it sometimes happens that an over-supply of the grain is carried to the feed pans, with the result that an uneven supply is fed to the thresher cylinder. The usual means for taking care of this over feeding is to stop the action of either the lower feed pans or draper, or both, but with the present mechanism, I am able, in the case of over feeding, merely to retard the action of the lower feed pans and draper, but not stop them, with the result that instead of carrying either too small or too large a load of grain to the thresher cylinder, there will be an approximate even feeding at all times.

In the normal operation of the device, the chain 12 constantly rotates the sprocket wheel 25, which has its inner gear 26 meshing with the teeth on the two small gears 41 on the spider. When the dog 31 is in its normal, or extended, position, the engagement lug 37 thereof will abut the friction rollers 33 on the spider, with the result that the gears 41 will be locked with relation to the inner gear 30 of the housing member, and gear 26 on the hub portion of the sprocket. The above action will result in the rotation of the whole gear mechanism, and therefore the shaft 21 at the same speed that the sprocket 25 moves. However, in the case of over feeding, the trip 24 is thrown into engagement with dog 31 and hence throws said dog to the dotted line position in Figure 8, where it is held by the pressure of said trip until the over supply of grain is taken care of in the feed pans. When this dog is thrown to the dotted line position, the engagement lug 37 is thrown to a position, where it will not engage the friction rollers 33 on spider 38, thus permitting the spider 38 to rotate, the small gears 41 meshing with the inner gear 30 and the small gear 26 on the hub of the sprocket 25. At the same time, the housing 28 is not permitted to move, due to the pressure of the trip 24 against the dog 31. Inasmuch as the sprocket 25 is likewise turning, the power transmitted to the shaft 21 will now be through the spider 38, or rather through its small gears 41, which mesh with the gear 26. The result is that, due to this gearing, a lower speed of rotation is given to the shaft 21 than it would have in its normal operation, where the whole gearing mechanism is rotated. Slowing up of the shaft 21 also retards the action of the lower feed pans 23, and inasmuch as the draper 17 has direct power connection with this shaft, it also has its speed retarded in a similar degree. Hence, we see that an overfeeding will result in automatically retarding the movement of the lower feed pans and draper until such over supply has been taken care of, and also with the result that an even amount of grain is fed at all times to the thresher cylinder.

Now, with respect to the governor member, it has already been stated that said governor member is directly connected to the main power shaft, and controls, due to its clutching action, all of the feeding elements above described. In other words, when the power shaft, or governor mounted thereon, is rotating at the desired speed, the clutch portion thereof operates to commence operation of the feeding mechanism.

The governor, per se, will now be described.

Referring to the drawings, I have shown a drive shaft 12ª, upon which is located the governor member now to be described. Surrounding the drive shaft 12ª is a drum 44, said drum being loosely mounted upon the drive shaft. Encircling the drum 44 is a cage 45 shown in detail in Fig. 7 of the drawings. This cage 45 has its hub portion 46 recessed as at 47 at three equidistant points thereon, said cut-out portions 47 adapted to house therein the roller members 48. The housing portion 49 surrounds the roller cage in a manner to provide roller or cam ways 50. As shown in Fig. 6, the hub portion 51 of the housing members 49 bears upon the drum 44. Projecting portions 52 of the housing have pivotally attached thereto at 53 the weight members 54. Means for relating the weight members to the housing 49 in a tensioned manner is provided in the bolts 55, which engage the supports 52 by means of their head portions 56, coil tensioning springs 57 and cross lugs 58, said lugs engaging at their outer ends the bifurcated ends of the weight members, and also providing an abutment, intermediate their ends, for the ends of the tensioning springs. The coil springs naturally retard the outward movement of the weight members caused by centrifugal action. Nuts 59 are screw threaded upon the outer ends of the bolt members, and provide means for adjusting the tension of the weight members. The inner ends 60 of the weight members 54 are fashioned to engage in an operative manner, similar claw shaped projections 61 on the cage member 45. The governor housing 49 is positively connected to the drive shaft 12ª by the following mechanism: A plate 62 is bolted at the points 63 to the housing, said plate having a clutch face 64 adapted to engage a similar clutch portion upon the member 65, which is keyed positively to the shaft 12ª by means of a set screw 66. The above described means for positively connecting the governor housing to the drive shaft has been utilized for the reason that it makes a structure practicable for manufacture, but any means for directly or otherwise connecting the housing positively to the drive shaft might as well be used. A sprocket 67, loosely mounted on the shaft 12ª has a clutch face 68 adapted to engage a similar clutch face on the loosely mounted drum 44.

The operation of my governor mechanism is as follows: Obviously, the present structure was devised to permit a quickly acting clutch operation, said clutch operation controlled directly and entirely by variations in the speed of the driving element, which controls the clutch. Excess loads upon any structure in which the present governor might be used, would not result in slippage so common in the friction type, inasmuch as the present governor, after once being clutched, due to the form or shape of the cam members, becomes more positive with increased load. The governor housing and portions connected thereto, including the cage member, rollers and weight members, are positively connected to the drive shaft 12ª through the plate 62, and portion 65. Thus, movement of the shaft 12ª rotates the above mentioned portions about the drum 44, which is loosely mounted on the shaft 12ª. It is desirable, of course, that upon the governor having reached a predetermined speed, the drum, which has a sprocket 67 in connection therewith, shall be rotated also. This clutching of the drum 44 is accomplished in the following manner: Centrifugal action, due to the rotation of the governor, throws weight members 54 outwardly in the manner shown in the dotted line portion in Fig. 5. This outward movement of the weight members, through the action of the claws 60 and 61, moves simultaneously with the cage 45 in a clockwise manner, as well as the rollers contained in the recesses therein. This clockwise movement of the cage forces the rollers between the periphery of the drum 44 and the cam like surfaces 50 on the inside of the housing 49, with the result that the clutching of the drum to the housing is effected and the drum consequently moves therewith.

It may be seen that with increased speed, the weight members will be thrown outwardly to an even greater extent, with a consequent tightening or forcing of the rollers between the drum and housing. Again, the increasing speed of the governor merely augments the clutching operation, said clutching operation having taken place almost instantly and with no perceptible slippage of the rollers when they were moved to a point where they engaged both the drum and the housing member. It may also be seen that immediately the cam engages the rollers, with the drum and thus starts to drive the drum member, the tendency of the drum is to run backward which tends to roll the rollers into firmer engagement with the cam and the drum. The greater the driving load placed on the drum, due usually to an increased amount of material between the feed members, the greater this tendency becomes. Thus, it will be seen that the clutch once engaged, the greater the load, the greater the driving power, irrespective of the increase of speed of the mechanism. As soon, however, as the speed drops below the predetermined engagement speed, the weights are drawn back by the springs, and the motion of the roller cage is reversed, and the roller thrown out of engagement with the drum and the cam.

As previously stated, the object of the present device is in the provision of a feeding device having in combination a governor member fashioned in a manner to increase the clutching action directly with increased speed thereof, and also in direct relation to the increased load placed thereon, in the present instance by the dragging of the feeding devices caused by an excessive amount of grain, or condition of the grain.

What I claim is:

1. A grain feeding device, comprising a conveyor, band-cutting and feeding mechanism, a governor controlling the operation of said devices, and clutch mechanism for said band cutting and feeding mechanism controlled by the governor, said clutch mechanism acting to increase the clutching action therein in direct proportion to the increased load upon the feeding devices.

2. A grain feeding device, comprising a main conveyor, band cutters, upper and lower feed pans, power means, a governor operating to control said carrier, band cutters and feed pans, and a clutch mechanism connected with the governor, acting to increase the clutching action therein in direct proportion to the increased load upon the feeding devices.

3. In a grain feeding device, a conveyor, band cutting and feeding devices, a governor controlling the operation of said devices, and clutch mechanism connected to said governor, said clutch mechanism acting in a manner to increase the clutching action therein in direct proportion to the increased load upon the feeding devices.

4. A grain feeding device comprising band cutting and feeding mechanism adapted to advance the grain, a governor, a clutch portion therein controlling the operation of said band cutting and feeding devices, and mechanism cooperating with said governor and clutching mechanism adapted to increase the clutching action in direct proportion to the increased load upon the feeding devices.

5. In a grain feeding device, feeding mechanism adapted to advance the grain, a governor member controlling the operation of said feeding mechanism, a clutch controlled by said governor member, and mechanism co-operating with said clutch to increase the clutching action in direct proportion to the increased load upon the feeding members.

In testimony whereof I have hereunto affixed my signature.

ARTHUR J. HARTLEY.